US012652438B1

(12) United States Patent
Roshan Ghias et al.

(10) Patent No.: US 12,652,438 B1
(45) Date of Patent: Jun. 9, 2026

(54) MULTI-OBJECTIVE OFF-POLICY LEARNING FOR PAGE COMPOSITION

(71) Applicant: Amazon Technologies, Inc., Seattle, WA (US)

(72) Inventors: Alireza Roshan Ghias, Seattle, WA (US); Branislav Kveton, San Jose, CA (US); Devendra Pratap Yadav, Seattle, WA (US); Fei Wang, Fremont, CA (US); Venkataramana Kini, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 18/189,127

(22) Filed: Mar. 23, 2023

(51) Int. Cl.
| | |
|---|---|
| *H04N 21/466* | (2011.01) |
| *G06F 16/904* | (2019.01) |
| *H04N 21/239* | (2011.01) |
| *H04N 21/472* | (2011.01) |

(52) U.S. Cl.
CPC ....... *H04N 21/4667* (2013.01); *G06F 16/904* (2019.01); *H04N 21/2396* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 2021/0027065 A1* | 1/2021 | Chung | H04N 21/6582 |
| 2021/0182912 A1* | 6/2021 | Misra | G06F 40/295 |
| 2022/0046302 A1* | 2/2022 | Shanson | H04N 21/8456 |

OTHER PUBLICATIONS

Joachims et al., "Deep Learning With Logged Bandit Feedback", *ICLR*, 2018, pp. 1-9.
Swaminathan et al., "The Self-Normalized Estimator for Counterfactual Learning", *Advances in Neural Information Processing Systems*, 2015, 28: 1-9.
Zheng et al., "Multi-Objective Recommendations: A Tutorial", *KDD*, 2021, pp. 1-35, https://moorecsys.github.io/.

* cited by examiner

*Primary Examiner* — Benjamin R Bruckart
*Assistant Examiner* — Charles N Hicks
(74) *Attorney, Agent, or Firm* — Knobbe Martens Olson & Bear LLP

(57) ABSTRACT
A system may receive user information associated with a user, third-party information associated with a third party, and a relevance-ordered list of media carousels comprising a plurality of media carousels. A system may collect historical log information comprising a plurality of displayed pages comprising media carousels and assign a reward value to each of the displayed pages to generate a reward vector, the reward value based on a user interaction associated with each displayed page. A system may estimate a logging policy based in part on the historical log information, and a target policy based in part on the reward vector. A system may train a carousel selection model by the target policy and the logging policy, then use the carousel selection model to generate a result. A system may select a plurality of media carousels from the relevance-ordered list.

20 Claims, 6 Drawing Sheets

MULTI-OBJECTIVE OFF-POLICY LEARNING FOR PAGE COMPOSITION

BACKGROUND

Media delivery systems can be configured to display various media types to users. In some implementations, media delivery systems will attempt to display media types that a user may find relevant to the user's interests, in addition to media types representative of various options provided by media providers affiliated with the media delivery system. For example, the media delivery system may display a row of media options based on the user's previous interest in watching certain types of media options. The row of media options may be referred to herein as a "carousel" or "media carousel." As an example, the media delivery system may display a carousel of television shows based on the user's previous interest in watching television shows. Additionally, the media delivery system may display a carousel of live entertainment options based on an interest of the live entertainment media owner in being presented to the user, even if the user has not previously indicated an interest in live entertainment. The user interface presented to the user has a limited display space, and therefore the selection of media carousels displayed to the user is limited.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
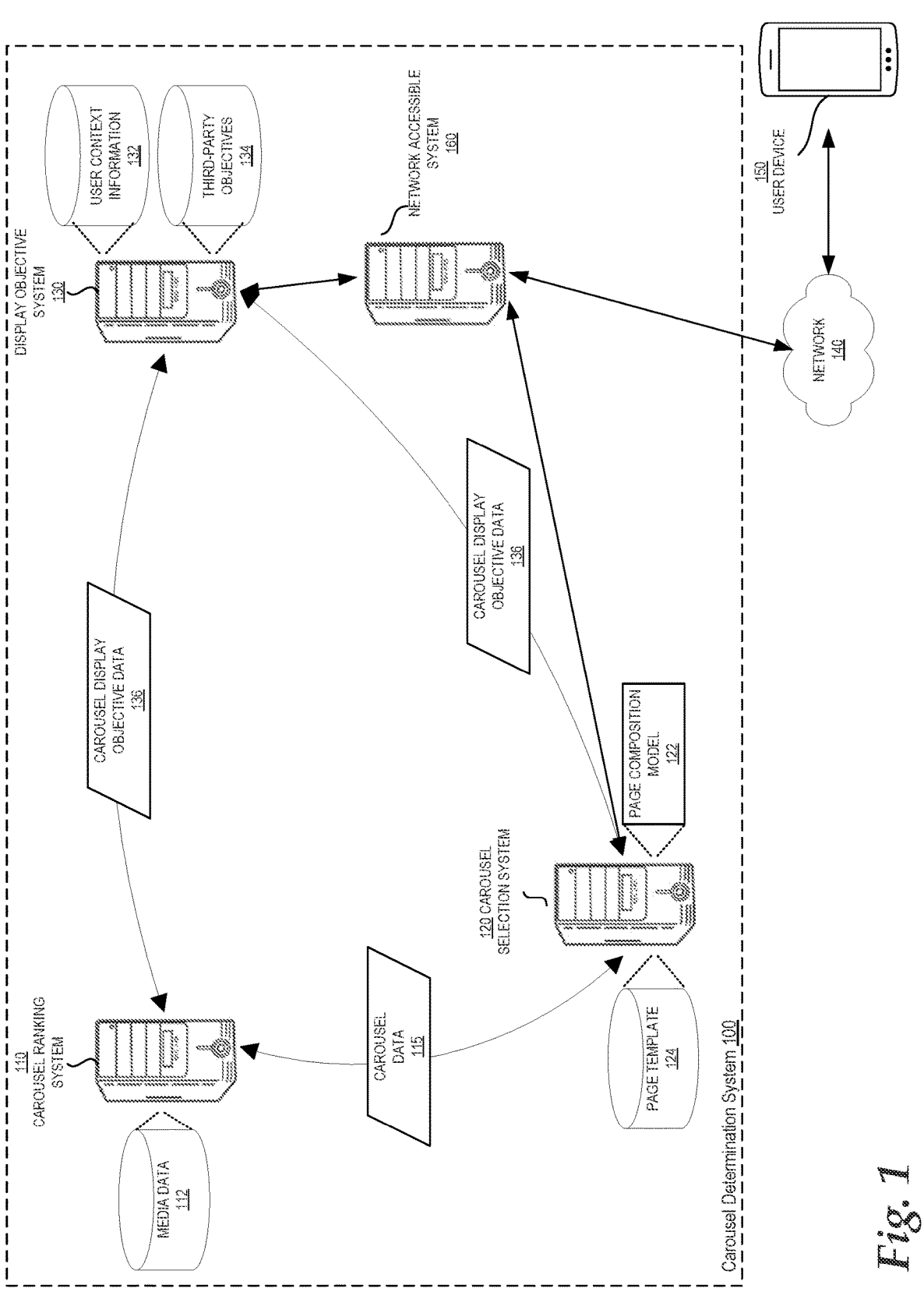
FIG. 1 is a diagram of an example system diagram implementing a page composition selection system according to some embodiments.

The present disclosure relates to a system for determining an optimal set of media carousels for display to a user on a user interface. The system may then select and transmit media carousels conforming to the determined optimal set.

Some conventional systems allow for the selection of media carousels for display to a user of a media delivery system. However, such systems require the input of a user or controller of the media delivery system in order to optimize the set of media carousels displayed to a user. For example, some systems require the use of "A/B testing," where at least two different sets of media carousels are selected, with a first set of media carousels displayed to a first set of users, and a second set of media carousels displayed to a second set of users. In the preceding example, the system automatically, or based on manual review, determines the success level of the sets of the media carousel. The success level of a set of media carousels may be based on optimization of the display, user selection of various media types, and whether the user selections correspond with objectives associated with the media delivery system. Due to the multiple, some-times competing, objectives of the media delivery system, determination of the success level may be subject to bias, such as popularity bias, negatively affecting the ability of the conventional system to select an optimal set of media carousels. Popularity bias commonly arises when a small subset of media items has a significantly higher level of user engagement. Conventional machine learning systems may then over-weight the most popular items for delivery to users leading to such systems recommending more popular items as a greater share of the total recommended items than is desirable.

Alternatively, some conventional systems use machine learning to determine the optimal set of media carousels to display to a user of the media delivery system. For example, a neural network may be trained to select media carousels for the set of media carousels displayed to the user. Conventional neural network systems may require supervised learning to train the neural network system, which may introduce bias into the results, such as popularity bias, negatively affecting the ability of the conventional neural network system to select an optimal set of media carousels. Popularity bias, as described above, may occur when the training data set for the neural network is too heavily weighted towards media with higher level of user engagement or when user engagement itself is given too much weight within a diverse training set. Popularity bias may lead to user dissatisfaction, such as when conventional systems repeatedly present the same popular media offering to a user across multiple carousels, reducing the apparent diversity of media options of the media delivery system.

Alternatively, some conventional systems may use A/B testing to determine the optimal set of media carousels to deliver to users of the media delivery system. A/B testing is performed by generating at least two sets of carousel options, presenting the at least two sets of carousel options to users of the media delivery system, and then measuring a set of response metrics, such as user engagement, to deter-mine which of the at least two sets of carousel options is optimal. A/B testing is often performed on a live, or pro-duction, environment. Performing A/B testing on a produc-tion environment leads to sets of media carousels which are not optimal being presented to users of the media delivery system, which may lead to user dissatisfaction from the reduced quality of media carousel options the user receives. A/B testing on a production environment may also lead to users experiencing errors, such as receiving content options which are not available or content options they have already viewed and are no longer interested in. Additionally, bias, such as popularity bias noted above, may negatively affect the system's determination of the best set of media carousels from the at least two sets of media carousels being tested by giving more weight to media carousels with higher levels of engagement at the expense of other system objectives, such as presenting users a diverse array of content options to engage with. For example, a poorly selected set of media carousels may present a user the same set of shows across multiple media carousels, leading to the included media being assessed as more popular even though the popularity results, in part, from a lack of options being presented.

Some aspects of the present disclosure address some or all of the issues noted above, among others, by implementing multi-objective off-policy learning using deep-Dirichlet multinomial regression. The deep-Dirichlet multinomial regression learning may be used to train, for example, a neural network such as a feed-forward neural network. Alternatively, the neural network may be a convolutional neural network, recurrent neural network, or any other type of neural network.

Aspects of the present disclosure related to training by deep-Dirichlet multinomial regression learning may involve the generation of a logging policy. The logging policy may, for example, be estimated by defining a loss function using log-likelihood with regularization of a Dirichlet-multinomial probability mass function. The logging policy may be determined based on existing log data.

Aspects of the present disclosure related to training by deep-Dirichlet multinomial regression learning may involve the generation of a target policy. The target policy may, for example, be estimated by maximizing a total reward, where the total reward is represented by a vector of total rewards. The vector of total rewards may be generated from log data comprising a binary action of the user, where the user either selects a media offering of a carousel or does not select a media offering of a carousel. The weight of each data point of the log data may be proportional to the value given to an objective of the media delivery system. For example, the weight of each data point of the log data may be proportional to the value assigned to a user selecting a particular media type. Reward translation may also be used to avoid propensity overfitting by off-policy learning and allow the use of log data where no user selection was made. The correct reward translation may be selected by performing a search such that the average important weight of the validation set used for training of the model is equal to 1. In some examples, training by deep-Dirichlet multinomial regression learning may be performed unsupervised, allowing for the automated generation and testing of page composition models (e.g., models used to select the set of carousels to be displayed on a given page).

Aspects of the present disclosure allow for the testing of the trained models offline, or on a closed system. The offline testing of the model avoids some bias issues described above related to A/B testing on live systems by allowing the model's media carousel selections to be assessed independent of user feedback. Additionally, offline testing avoids the risk of presenting unavailable content or suboptimal media selections to users of the media delivery system, potentially avoiding user dissatisfaction with the media delivery system.

Aspects of the present disclosure may be described in relation to a "media carousel" or a "carousel view." A "media carousel" or a "carousel view" may refer to a group of related media items (e.g., television shows, movies, on-demand content, content available for purchase, etc.) organized into a container in which at least some of the related media items are displayed. In some instances, some, but not all, of the related media items are displayed at any one time. The container may include an interactive element (e.g., a directional arrow, a dropdown box, etc.) that provides a user with the option to scroll through the container (e.g., by clicking a directional arrow, by clicking the dropdown box, etc.) to view any related media items that are not currently displayed.

Various aspects of the disclosure will be described with regard to certain examples and embodiments, which are intended to illustrate but not limit the disclosure. Although aspects of some embodiments described in the disclosure will focus, for the purpose of illustration, on particular examples of machine learning algorithms, user devices, computing devices, media types, and the like, the examples are illustrative only and are not intended to be limiting. In some embodiments, the techniques described herein may be applied to additional or alternative types of machine learning algorithms, user devices, computing devices, media types, and the like. Additionally, any feature used in any embodiment described herein may be used in any combination with any other feature or in any other embodiment, without limitation.

Example Image Translation

With reference to an illustrative example, FIG. 1 shows an example carousel determination system 100 for selecting, transmitting, and displaying a set of media carousels on a user device 150 accessing a media delivery system. The carousel determination system 100 is a component of a media delivery system, and may manage carousel selection, delivery, and display. The carousel determination system 100 may have information about the media deliverable to users by the media delivery system, such as through a content delivery network. Components of the carousel determination system 100 may receive additional information from the media delivery system, such as user subscription information, user preference information, third-party information, and the like. The carousel determination system 100 comprises a display objective system 130, a carousel ranking system 110, a carousel selection system 120, and a network accessible system 160. The carousel determination system 100 may additionally be in communication with a network 140, and the user device 150.

In some embodiments, the display objective system 130 may be a server, or other computing device, capable of storing a set of display objectives and generating carousel display objective data 136 from the set of display objectives. The display objective system 130 may include physical hardware components (e.g., one or more processors, memory, input/output interfaces, network interfaces, an internal bus, etc.) and may be physically and/or logically isolated from the other components in the carousel determination system 100 (e.g., the carousel ranking system 110, the carousel selection system 120, the network accessible system 160, and the user device 150). The display objectives, in some examples, comprise information stored in a user context information data store 132, and a third-party objective data store 134.

In some embodiments, the user context information data store 132 is a database containing information describing the context of a user using the media delivery system to view media. For example, the user context information data store 132 may include a user device type, a user device location, a time of day, an indicated user interest (e.g., a selection made by the user indicating media types of interest), and/or the like. The user context information may be for all or some of the users of the media delivery system. The user context information data store 132 may be updated from user devices at regular intervals, random intervals, when a user connects a user device to the media delivery system, when a user makes a selection of a media offering of the media delivery system, or at any time when the information may be obtained from the user device.

In some embodiments, the third-party objective data store 134 is a database containing third-party information associated with objective data for the media delivery system. The third-party information may further include objective data for third parties affiliated with the media delivery system (e.g., a third-party subscription service offering a subscription through the media delivery system).

The carousel ranking system 110, in some examples, comprises information stored in a media data store 112. In some embodiments, the carousel ranking system 110 may be a computing device of the carousel determination system 100 implementing a machine learning algorithm trained to rank a plurality of media carousels stored in the media data store 112. Alternatively, the carousel ranking system 110 may rank the media carousels stored in the media data store 112 in communication with additional components of the carousel determination system 100, components outside the carousel determination system 100, or a controller of the carousel determination system 100. The media carousels may be generated by grouping available media according to attributes of the available media stored in the media data store 112, for example a media carousel may be generated based on a common genre (e.g., mystery, action, drama, comedy, etc.) of media. Alternatively, a carousel may be generated based on grouping of media associated with a specific media provider (e.g., media licensed to the media delivery system by a single owner, media produced by a same entity, media aired by a same entity, etc.). Alternatively, a carousel may be generated based on a media format (e.g., live programming, ad-supported, rental media, etc.) The carousels may be generated by a component of the carousel ranking system 110, or be generated by another component of the carousel determination system 100 and stored in the media data store 112.

In some embodiments, the carousel selection system 120 may be a computing device configured to run a machine learning system configured to select a set of carousels based on the carousel data 115 received from the carousel ranking system 110, and the carousel display objective data 136 received from the display objective system 130. The carousel selection system 120 may alternatively or additionally receive information related to a user or the user device 150 from the user device 150 via the network 140. The carousel selection system 120, in some examples, comprises a page composition model 122 and a page template data store 124.

The page composition model 122 may be a neural network (e.g., a feed forward neural network, recursive neural network, etc.) as described in reference to training a page composition model in FIG. 4 below.

The page template data store 124 may comprise a database storing a plurality of page templates. Each of the page templates may be configured for display based on a type of the user device 150, a display resolution of the user device 150, a mode operation of an application configured to display information of the carousel determination system 100 to the user on the user device 150, or any other variable related to the format of display for the selected carousels on the user device. A page template may be selected from the page template data store 124 based, for example, on a user device attribute (e.g., a user device display size, a user device display aspect ratio, a user device display feature such as high dynamic range, etc.).

In some embodiments, the network accessible system 160 may be a server configured to be accessible to the user device 150. The network accessible system 160 may be in communication with the display objective system 130 and the carousel selection system 120 by an internal network connection (e.g., an ethernet connection, a wireless network connection, etc.). In alternative examples, the network accessible system 160 may operate on the same physical hardware as, or be logically incorporated into the functioning of, any of the carousel ranking system 110, the carousel selection system 120, or the display objective system 130. The network accessible system 160 may also be in communication with a network 140.

In some embodiments, the network 140 may include any wired network, wireless network, or combination thereof. For example, the network 140 may be a personal area network, local area network, wide area network, over-the-air broadcast network (e.g., for radio or television), cable network, satellite network, cellular telephone network, or combination thereof. As a further example, the network 140 may be a publicly accessible network of linked networks, possibly operated by various distinct parties, such as the Internet. In some embodiments, the network 140 may be a private or semi-private network, such as a corporate or university intranet. The network 140 may include one or more wireless networks, such as a Global System for Mobile Communications (GSM) network, a Code Division Multiple Access (CDMA) network, a Long Term Evolution (LTE) network, or any other type of wireless network. The network 140 can use protocols and components for communicating via the Internet or any of the other aforementioned types of networks. For example, the protocols used by the network 140 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. The network 140 may be in communication with the network accessible system 160 and the user device 150. The network 140 may transmit media carousel data between components of the carousel determination system 100 and the user device 150.

In some embodiments, the user device 150 may be a computing device configured to display media via a display to the user. For example, the user device 150 can be any computing device, such as a desktop computer, a laptop computer, a mobile phone, a tablet, a personal computer, a wearable computer, a server, a personal digital assistant (PDA), a hybrid PDA/mobile phone, an electronic book reader, a television, a set-top box, a voice command device, a camera, a digital media player, a microconsole, a network appliance, a streaming device, a remote control, a game controller, a speaker, and/or the like. The user device 150 may be in communication with the carousel determination system 100 via the network 140. The user device 150 may execute or run one or more applications that cause the user device 150 to display one or more media carousels, based on media carousel information received from the carousel determination system 100.

Example Multi-Objective Media Carousel Selection System

Figure 2:
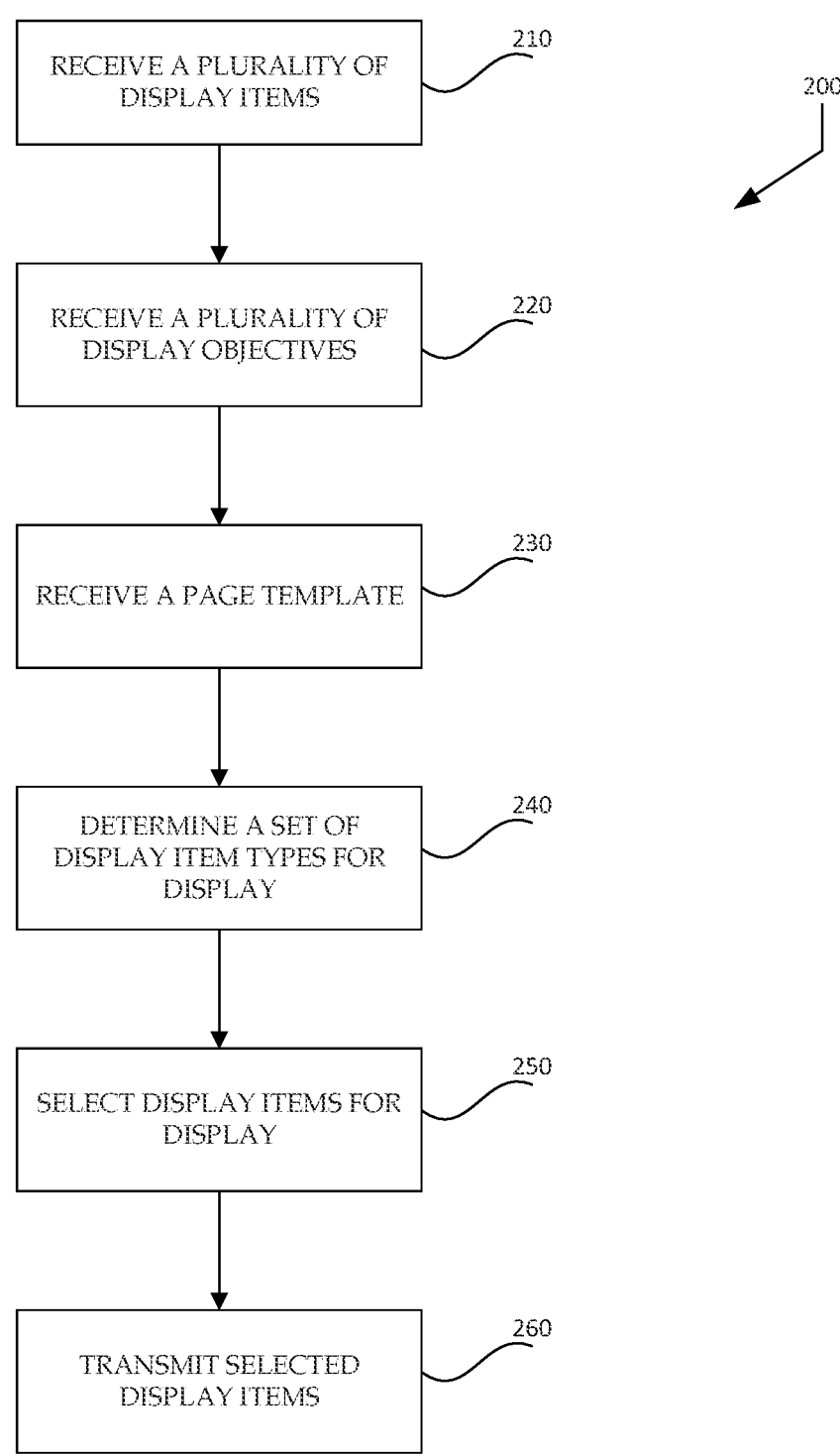
FIG. 2 is a flow diagram of an illustrative routine for selecting media carousels for a page composition for a user device, such as the user device of FIG. 1.

FIG. 2 is an example routine 200 for selecting media carousels for a page composition to be displayed on a user device 150 illustratively implemented by a page composition model, according to one embodiment. As an example, the carousel selection system 120 comprising the page template data store 124 and the page composition model 122, of FIG. 1 can be configured to execute the routine 200. The routine 200 begins at block 210, in some examples based on the carousel selection system 120 receiving a request transmitted through the network accessible system 160 for a set of carousels to display to a user.

At block 210, a plurality of display items is received, for example, by the carousel selection system 120. The display items, in this example, may comprise a set of media carousels representing media which may be available to a user of the user device 150 interacting with a media delivery system. As discussed above, the media carousels may be generated by grouping available media according to attributes of the available media. The display items may be associated with a specific type of media. However, the display items initially may be empty when received (e.g., the media carousels may not include or display any media items).

For example, a media carousel named "TV Shows" may, when filled, comprise a set of available television show options from varying sources (e.g., a first television show from a first media subscription service, and a second television show from a second media subscription service). The media carousel named "TV Shows" may comprise both free and paid television content from various paid or free media sources accessible through the media delivery system. In another example, a media carousel named "Free to Me" may comprise movies, television shows, and other media for which the user of the user device 150 has access without a required additional payment. The media in the "Free to Me" carousel may belong to the media delivery system, a partner media delivery system wherein the content of the partner media delivery system is accessible through the media delivery system or from any other source where the media content is made available for free to the user of the media delivery system. Any number of display items may be received for use in the routine 200. When the plurality of display items available to the media delivery system has been received, the routine 200 moves to block 220.

At block 220, a plurality of display objectives is received, for example, by the carousel selection system 120. The display objectives, in this example, may comprise a set of objectives related to the display items received at block 210. The display objectives may indicate a priority for a given type of display item (e.g., a priority for displaying ad-supported free content to the user). The display objectives may, in some instances, conflict. For example, a first display objective for a user may indicate a user's lack of interest in live television programming, and a second display objective related to a third party may indicate an interest in displaying a display item associated with live television programming.

In some examples, an objective of the set of objectives may indicate a first media type associated with a display item should be shown to the user based on a third-party objective of the media delivery system selected by an entity associated with the first media type. A second objective of the set of objectives may indicate a media type associated with a display item should be shown to the user based on a user preference (e.g., the display objective system 130 may determine, based on information of the user context information data store 132, a user enjoys historical fiction, and set a high display priority value for display items of the plurality of display items associated with historical fiction). When the plurality of display objectives for media of the media delivery system has been received, the routine 200 moves to block 230.

At block 230, a page template is received, for example, by the carousel selection system 120. The page template may be received from the page template data store 124 of the carousel selection system 120. Alternatively, the page template may be received from another component of the carousel determination system 100. The page template, in this example, may be based on a type of user device (e.g., a page template for a 13-inch screen may be received when the user device 150 is determined to be a laptop with a 13-inch screen), where the page template is configured to display a set of display items preferably in format that is easily understood and navigated by the user.

For example, a page template configured for display on a 13-inch screen may display an initial number of display items based on a height (e.g., in pixels, inches, centimeters, etc.) or a resolution (e.g., 1920×1080 pixels) of the display item. Where display items of the plurality of display items received at block 210 are all of the same height, the page template may indicate a positioning on a display screen (e.g., a computer monitor) for each display item. Where display item types have varying heights, the page template may indicate a size in which a display item type must fit. The positioning may be indicated by reference to a pixel coordinate of, for example, a top left corner of a display item, where the (0,0) position may be a corner of the display or the center of the display. Alternatively, positioning may be indicated by a relative location in reference to an element of the page template (e.g., a page title). The positioning may indicate an initial position of a display element. Additionally, the positioning may be updated as user adjusts (e.g., by scrolling, selecting, expanding, or collapsing) the displayed elements.

The page template may additionally include information describing functionality of the displayed page. For example, the page template may indicate that a display element may expand when selected (e.g., by a touch or a click) by the user. In another example, the page template may include information unrelated to the display items, such as an interactive menu. When the page template has been received, the routine 200 moves to block 240.

At block 240, a set of display item types for display is determined. The determination of display items may be performed, for example, by a page composition model 122 of the carousel selection system 120. The determination of display item types for display may be based on the plurality of display objectives received at block 220, the plurality of display items received at block 210, and the page template received at block 230.

For example, the page template received at block 230 may be used to determine a number of display item types required for display. The number of display item types required for display may indicate a minimum or a maximum number of display item types to be determined. The page template may, additionally, be used in the determination of display item types to select display item types compatible with display on a display type associated with the page template (e.g., a page template for a cellular device). For example, certain media types associated with a display item may be determined to be more suitable to a certain display type (e.g., high-dynamic range display) or device type (e.g., cellular device) indicated by the received page template. Some or all of this information may additionally or alternatively be indicated by the received plurality of display objectives.

The plurality of display objectives received at block 220 may, as discussed above, include a variety of objectives. The display objectives may be of varying levels of priority when used to select display items from the plurality of display items received at block 210. The priority of a display item may additionally be determined by the page composition model 122, based on information learned by the page composition model 122 during training. When the set of display item types for display have been selected, the routine 200 moves to block 250.

At block 250, display items are selected for display. The display items may be selected based on the determination of the set of display item types made in block 240. The plurality of display items may have been received in set of ordered lists organized by display item type, for example ranked by popularity, or in a random or unordered list. Where the display items are received in an ordered list, the carousel selection system 120 may select display items from the top of the list of items of a display item type until a number of display items satisfying the determination made at block 240 has been selected. For example, if the result of block 240 indicates that two ad-supported streaming media display items should be selected, then a component of the carousel determination system 100 such as the carousel selection system 120 may select two ad-supported media streaming display items from the plurality of display items received at block 210. Alternatively, the display items may be randomly selected from display items of a display item type until a number of the display item type satisfying the determination made at block 240 has been satisfied. Alternatively, the display items may be selected from the bottom of the ordered list, for example to increase user exposure to less-viewed display items. When the display items for display have been selected, the routine 200 moves to block 260.

At block 260, the display items selected at block 250 are transmitted. In some implementations, the display items may be transmitted from the carousel selection system 120 to the network accessible system 160. The network accessible system 160 may then transmit the selected display items to the user device 150 via a network 140. Alternatively, the display items selected at block 250 may be transmitted to a test system in communication with, or included in, the carousel determination system 100 and the display items may then be used to assess the performance of the page composition model 122 or the carousel selection system 120. Alternatively, the display items selected at block 250 may be transmitted to a training system and used to train or update the page composition model 122. When the display items selected at block 250 have been transmitted, the routine 200 ends.

Figure 3:
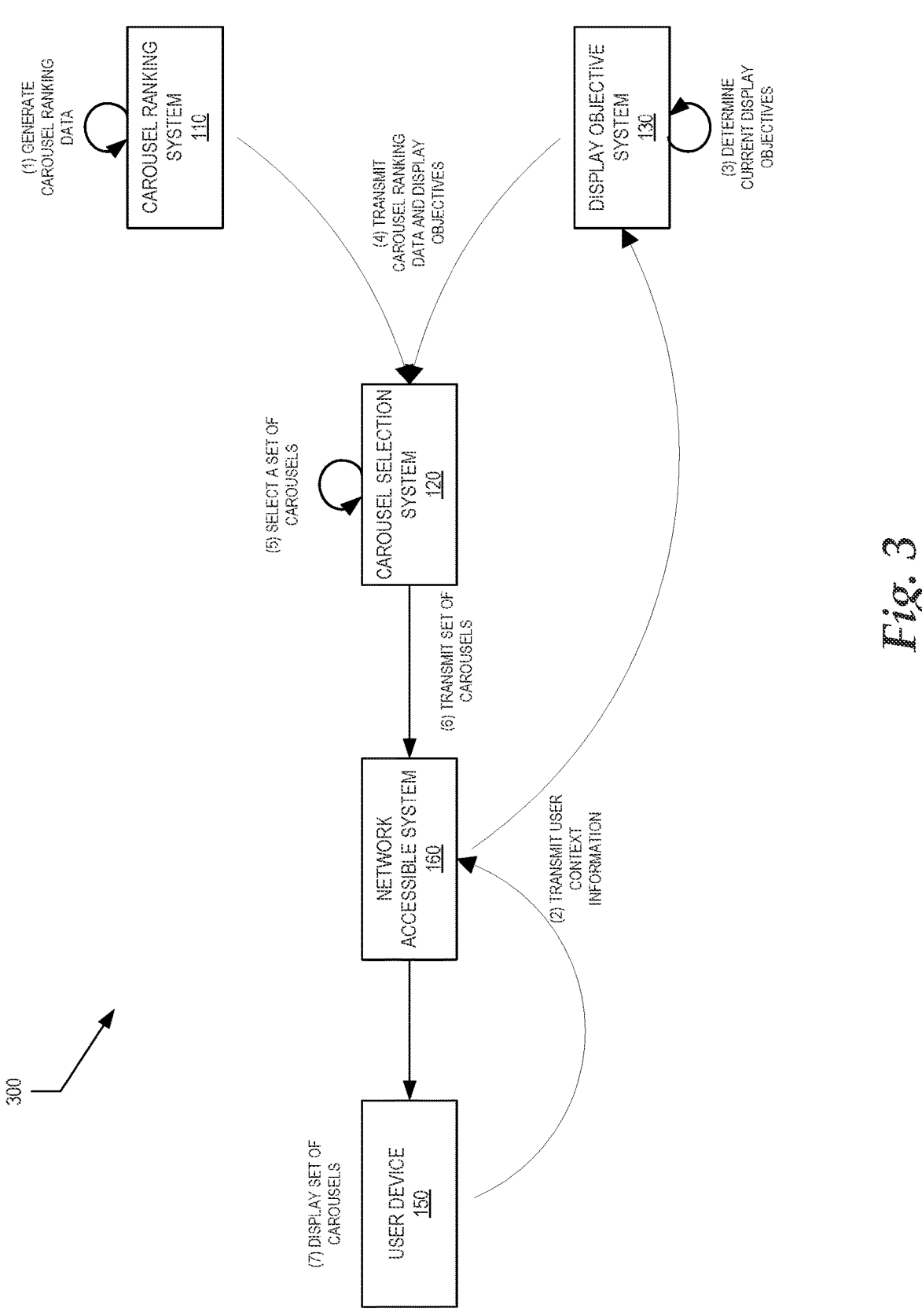
FIG. 3 is a block flow diagram of illustrative data flows that may occur when selecting and displaying a set of media carousels for a user device according to some embodiments.

FIG. 3 is an example data flow 300 for the carousel determination system 100 of FIG. 1. Starting at (1), the carousel ranking system 110 continuously generates carousel ranking data. The carousel ranking data may be updated, for example, based on information received from the user device 150, the display objective system 130, or any other component of the carousel determination system 100 providing information relevant to determining the relative display importance of media carousels. The media carousels being ranked may be stored in the media data store 112 of the carousel ranking system 110, or by another component of the carousel determination system 100. The result of (1) may be a set of ordered lists ranking the media carousels in order of display priority.

At (2), user context information may be transmitted by the user device 150 to the display objective system 130 via the network accessible system 160. The user context information may include information such as a device type, a display size, a display resolution, a time of day where the user device is located, a user device input option, a display type (e.g., high-dynamic range display), a user device activity level (e.g., the amount of processing of the user device dedicated to other applications, or the other applications in use on the user device), and any other information related to the user device. The user context information is transmitted from the user device to the display objective system 130, in the present example, via the network accessible system 160. The user device 150 may communicate with the network accessible system 160 by a network 140, for example a cellular network. Alternatively, the user device 150 may be in communication with one or more other components of the carousel determination system 100 through which user context information may be transmitted to the display objective system 130.

At (3) of the data flow 300, the display objective system 130 determines current display objectives. The display objective system 130 may use the user context information received from the user device 150 as part of the determination of display objectives. Additionally, the display objective system 130 may be in communication with a user context information data store 132 containing additional user information about a user of the user device 150, for example the user's viewing history, indicated preferred media types, media service subscription information, and other user information stored by the media delivery system. The additional user context information may be used as part of the determination of display objectives.

Additionally, the display objective system 130 may be in communication with a third-party objective data store 134 storing information about a set of display objectives relevant to third parties associated with the media delivery system, including a company controlling the media delivery system. For example, the third-party objective data store 134 may include information associated with a requirement to display a media type, or content owned by a media provider (e.g., a company licensing content to the media delivery system) at a certain frequency, with a certain placement, or to a specific type of user.

The display objective system 130 may use any combination of the data discussed above, or any additional data available to the display objective system 130, to determine the current display objectives.

At the (4) of the data flow 300, the carousel ranking system 110 transmits the carousel ranking data determined at (1) to the carousel selection system 120. Additionally, at (4), the display objective system 130 may transmit current display objectives determined at (3) to the carousel selection system 120.

At (5), the carousel selection system 120 selects a set of carousels from a set of available media carousels, for example the carousels stored in the media data store 112. The selection of the set of carousels may be made by following the example routine 200. The selection may be made by a page composition model 122 of the carousel selection system 120. Additionally, a page template used to select the set of carousels may be selected by the carousel selection system 120 at the (5) from the page template data store 124, for example based on the type of user device 150 the selected set of carousels will be transmitted to at the (6).

At the (6), the set of carousels selected by the carousel selection system 120 at (5) is transmitted to the network accessible system 160. The network accessible system 160 may then transmit the set of carousels to the user device 150 via a network 140, for example a cellular network.

At (7), the set of carousels is displayed by the user device 150. The order of display of the set of carousels may be determined by software operating on the user device 150. Alternatively, the order of display of the set of carousels may be determined by the network accessible system 160, the carousel selection system 120, or another component of the carousel determination system 100 prior to the transmission of the set of carousels to the user device 150. When the set of carousels is displayed by the user device 150, the example data flow 300 ends.

While the operations of the data flow 300 are described above as being performed in a certain order, this is not meant to be limiting. Some or all of the operations of the data flow 300 can be omitted, performed in a variety of orders, and/or performed concurrently.

Figure 4:
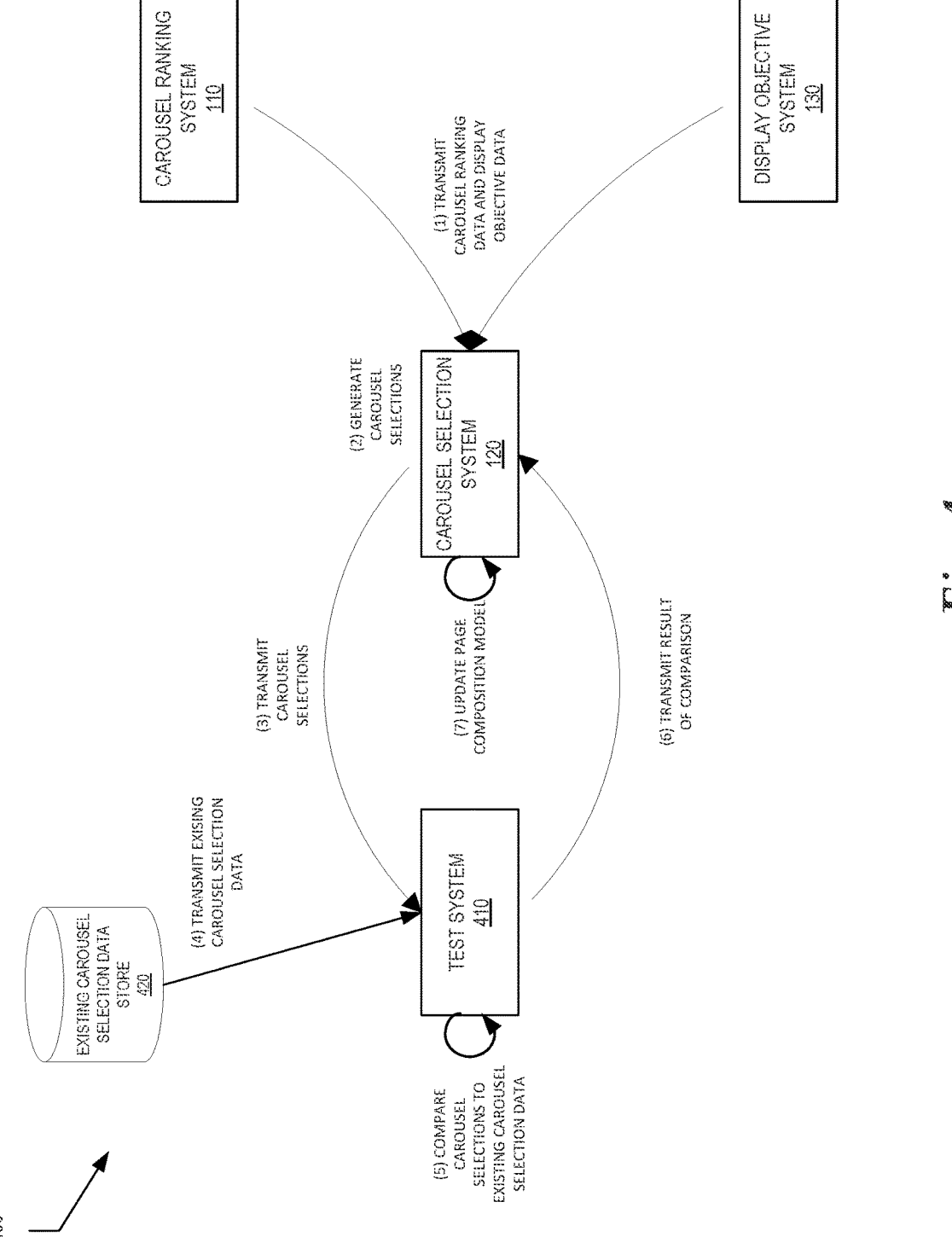
FIG. 4 is a block flow diagram of an example data flow for training a carousel selection system to select media carousels according to various objectives.

FIG. 4 is an example training system data flow 400 for a page composition model 122, described with reference to the example carousel determination system 100 of FIG. 1.

At (1) of the training system data flow 400, the carousel ranking system 110 and the display objective system 130 transmit, respectively, carousel ranking data and display objective data to the carousel selection system 120. The carousel ranking data transmitted from the carousel ranking system 110 to the carousel selection system 120 may comprise a set of carousels, ranked according to various criteria. The ranked set of carousels may comprise subsets of ranked carousels, where each subset is associated with a media format (e.g., television show, movie, live programming, ad-supported live programming, etc.), an associated media owner (e.g., programming offered by a subscription media service), a media genre (e.g., science fiction, historical biography, etc.), and/or a relevance based on common user interests (e.g., a set of carousels determined to be relevant to users who view action movies, the set containing various media types). The ranked set of carousels may be a relevance-ordered list, where each carousel of the set of carousels in the list is assigned a position based on a relevance associated with each carousel.

The display objective data transmitted by the display objective system 130 to the carousel selection system 120 may include display objectives associated with third-party objectives, objectives associated with the media delivery network, and display objectives associated with user objectives. For example, third-party objectives may be an interest of an entity offering content via the media delivery system in being visible to users of the media delivery system. In other examples, objectives may further include the interest of the media delivery system in displaying various types of content to users, for example paid rental content or content purchasable through the media delivery system. User objectives may include displaying content determined to be of interest to a user of the media delivery system, content available in a format usable by the user device 150 (e.g., high dynamic range content, 4K content, content formatted for display on a mobile device, etc.), content associated with a location of the user (e.g., a local television channel, local sports game, etc.), or other objectives representing content types the user is likely to be interested in.

At (2), the carousel selection system 120 generates carousel selections based in part on the carousel ranking data and display objective data. The carousel selection system 120 may additionally use information from a page template data store 124 to generate carousel selections. The page template data store 124 may include a template for a user interface layout, such as the example user interface 500 of FIG. 5, indicating a number of carousels, a type of carousel, a device type associated with a page template, a display context of a page template (e.g., indicating the page template is to be displayed when an application is opened), and other information associated with the format and display of a display page for interacting with the media delivery system.

The carousel selection system 120 may generate carousel selections using a page composition model 122. The page composition model 122 may be one of many page composition models stored by a memory of the carousel selection system 120. The page composition model may use one or more machine learning algorithms to determine the carousel selections (e.g., k-means clustering, one or more neural networks, naïve Bayes, a decision tree, etc.).

In this exemplary implementation, the carousel selection system 120 implements multi-objective optimization using off-policy learning to train the page composition model 122. Multi-objective optimization may not result in a single optimal solution, instead providing a set of optimal solutions (e.g., a Pareto front). All solutions in the set of optimal solutions may be equally valid, and the selection of a single optimal solution from the set of optimal solutions is based on objectives of the media delivery system. For example, it may be desirable to select an optimal solution maximizing an objective associated with live television programming, and an optimal solution from the set of optimal solutions maximizing a live television offering may then be selected.

Off-policy learning may be unsupervised learning. Unsupervised learning may minimize bias in the training of the page composition model 122. Page composition training may only be provided with partial feedback based on page composition logs, resulting in a greater risk of bias from supervised learning. Bias in the training of the page composition model 122, such as popularity bias, may lead to the selection of sub-optimal solutions. Therefore, unsupervised learning may be preferable. Additionally, unsupervised off-policy learning may be performed by the carousel selection system 120 offline, without the need to implement or apply the page composition model 122 on a live portion of the media delivery system. Offline learning may make the training of the page composition model 122 more efficient, as multiple potential page composition models may be trained and tested simultaneously, with the most accurate models being selected without user input or with minimal user input.

To implement off-policy learning, in one example, the carousel selection system 120 can perform the following operations and calculations. For example, the carousel selection system 120 may calculate a solution to $\Pi$ ($k_i|x_i$), where i represents the sample, $k_i$ represents the actions, $x_i$ is the page, and $\Pi$ is the policy. Here, $k_i$ may be a page characterized by a set number of carousels for the various media types, for example in the top twenty of an ordered list of the media type received from the carousel ranking system 110. The number of combinations of media types may be very large, and so it may off-policy training may use Dirichlet multinomial (DM) regression may be applied to media type combinations to estimate the policy using a corresponding probability mass distribution.

The probability mass function (PMF) of the DM distribution is defined as:

$$DM(k \mid a) = \frac{\tau(a_0)\tau(k_0 + 1)}{\tau(k_0 + a_0)} \prod_{m=1}^{M} \frac{\tau(k_m + a_m)}{\tau(a_m)\tau(k_m + 1)}$$

where $\tau$ is the tau function. The mean of the DM distribution is a vector calculated as $k_0 a$. Linear DM regression is performed by estimating a as a linear function of some features x and labels k, which may then be extended to a neural network solution (e.g., a feed forward neural network, a recurrent neural network, a transformer neural network, etc.) using the ordered list of carousel ranking data of size J received from the carousel ranking system 110. The ordered list of carousel ranking data may be defined as $$\{C_{ij}\}_{j=1}^{J}$$

for with ranking data size J for a page i containing M media offer types, with the goal of selecting $k_i=(k_{i,1} \ldots k_{i,M})$ carousels for each media offer type for a total of $k_0$ selections, where $$k_0 = \sum_{m=1}^{M} k_m.$$

The value $k_i$ represents a page template, such as a page template stored in the page template data store 124. Based on $k_i$, the top-ranked carousels may be selected from the ordered list of carousel ranking data received from the carousel ranking system 110 for each media offer type until the number of carousels needed for each media offer type has been reached.

Now, $\Pi(k_i|x_i)$ may be calculated for the page represented by the page template. The value $x_i$ now represents the various objectives (e.g., display objectives received from the display objective system 130), and $\Pi$ represents a selection model. The objectives $x_i$ may be transmitted to neural networks f and g, which generate output $p_i$ and $q_i$ respectively. The values $p_i$ and $q_i$ may then be reparametrized by the page composition model 122 to generate $a_i$, the shape parameters of the Dirichlet distribution. The model $\Pi$ may now be represented as a neural network to become the page composition model 122. Therefore, the following equations (1)-(4) represent the conversion of the input objective data to an output selection of carousels from the ordered list of carousels received from carousel ranking system 110 when training the page composition model 122:

$$k_i \text{ represents the } DM(a_i) \tag{1}$$

$$a_i = a_{o,i}\varphi_i \tag{2}$$

$$\varphi_i = \text{Softmax}(p_i); a_{0,i} = \exp(q_i) \tag{3}$$

$$p_i = f_\Omega(x_i); q_i = g_\omega(x_i) \tag{4}$$

In the above equations, $\omega$ designates the respective weights of the functions. In order to perform off-policy learning based on the above, two terms representing the logging policy and the target policy are derived by the carousel selection system 120, which may be represented as $\Pi_0(k_i|x_i)$ and $\Pi t(k_i|x_i)$ respectively. Both the logging policy and the target policy may be determined by the carousel selection system 120 from the DM distribution.

In some examples, one week of log data may be used indicating all pages shown to users of the media delivery system, from which stratified samples may be selected. Features of the log data, such as historical consumption from users, device type, day of the week, hour of the day, features of a carousel associated with an offer type, and/or the like, may be included in the training data. A reward associated with a media offer type is assigned a value of 1 by the carousel selection system 120 where the user selects a media offering from the carousel, and assigned a value of 0 by the carousel selection system 120 where a user does not select a media offering from the carousel. If no media offering is selected from a page represented in the log data, no reward value is assigned by the carousel selection system 120, but reward translation may be used to maintain the page data in the training set for optimization.

In some examples, the logging policy and the target policy may then be estimated by the carousel selection system 120 from the log data using a DM PMF. The target policy may be selected by maximizing the total reward value based on the multiple objectives of the page composition model 122 received from the display objective system 130. The weight of each data point of the log data may be proportional to the value given to the media offer type selected based on the display objectives and may be inversely proportional to the likelihood a given media offering was in the log data based on user context. Neural networks f and g, described above, may then be selected by the page composition model 122 during training to maximize the reward. In some examples, an offset value may be applied to make sure the target policy is similar to the logging policy, limiting or preventing concave vs. concave solution distributions based on the output of networks f and g. In some examples, the last layer bias term of g may be set to the offset value to ensure the target policy is closer to the logging policy.

When the page composition model 122 of the carousel selection system 120 has been trained, it may then generate the carousel selections for (2) of the training system data flow 400. The carousel selections are then transmitted to a test system 410 at (3) of the training system data flow 400. At a point in time which may be before, after, or simultaneously with (3), (4) occurs and existing carousel selection data is transmitted from an existing carousel selection data store 420 to the test system 410. The existing carousel selection data may be based on previously generated carousel selections presented to users of the media delivery system by a system other than the carousel selection system 120, or by a model other than the current page composition model 122. The existing carousel selection data may comprise carousels selected based on A/B testing presented to users of the media delivery system.

When the test system 410 has received the existing carousel selection data and the current carousel selections of the trained page composition model 122, a comparison is made to determine how close the current carousel selections are to the existing carousel selection data at (5), such as by generating an accuracy score for the current carousel selections. The test system 410 then transmits the result of the comparison performed at (5) to the carousel selection system 120 at (6).

The carousel selection system 120 may then use the result of the comparison received from the test system 410 at (7) to determine the accuracy of the current page composition model 122. Based on the result, the page composition model 122 may be retrained, or a new page composition model may replace the page composition model 122 and testing may continue until a page composition model is found that most closely generates carousel selections matching the existing carousel selections.

While the operations of the training system data flow 400 are described above as being performed in a certain order, this is not meant to be limiting. Some or all of the operations of the training system data flow 400 can be omitted, performed in a variety of orders, and/or performed concurrently.

Example User Interface

Figure 5:
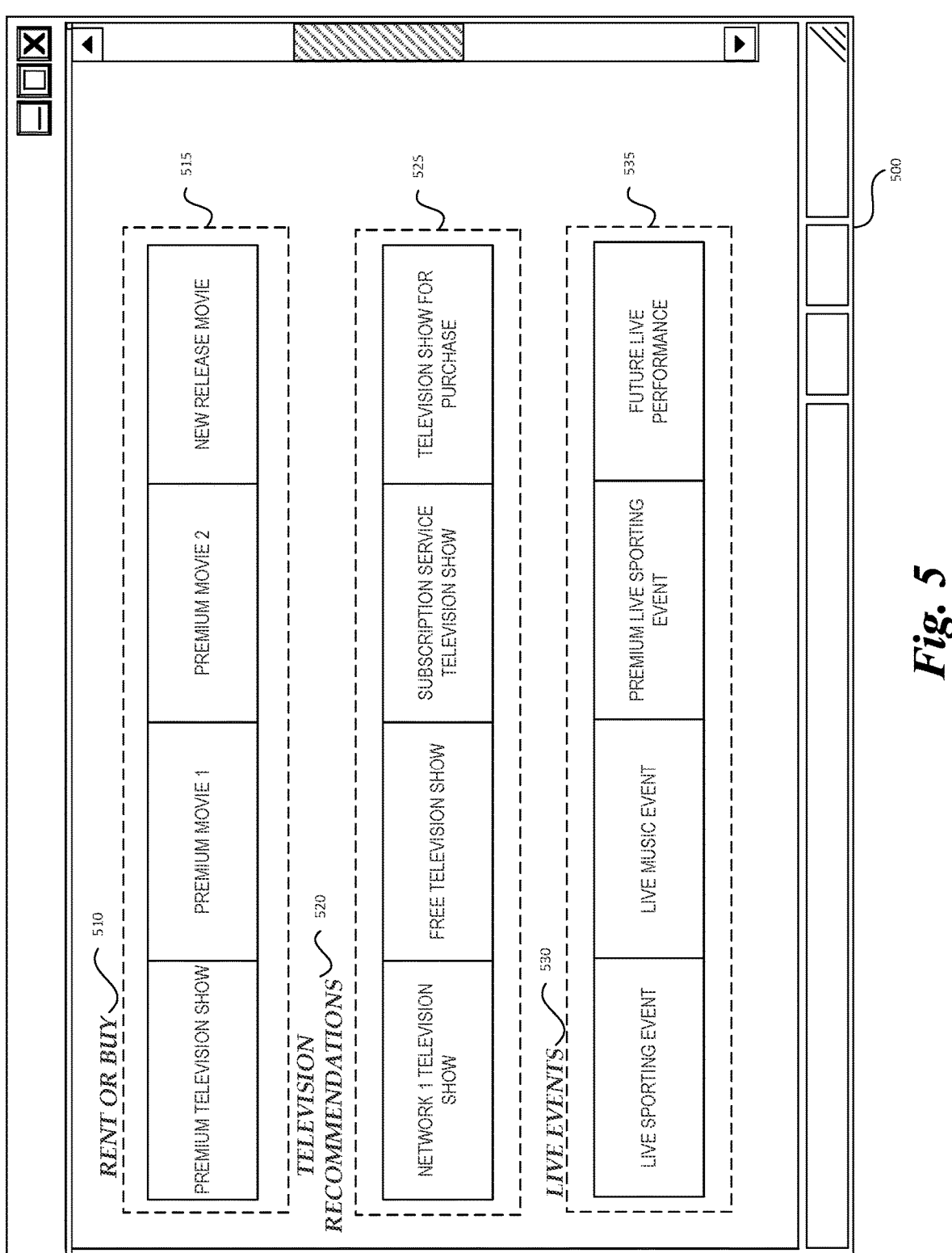
FIG. 5 illustrates an example user interface depicting a content page that is displayed in a browser application running on a user device, such as the user device of FIG. 1.

FIG. 5 is an example user interface 500, which may be displayed to a user of the media delivery system on a user device 150. For example, the user interface 500 may appear in a browser application operating on a user device 150. Alternatively, the user interface 500 may appear in an application designed to deliver media of the media delivery system to the user device 150 (e.g., an "app").

A first title 510, associated with a first carousel 515, may be displayed at the top of the user interface 500. The first title 510 and first carousel 515 may be placed in the top position based on a ranking of a set of carousels selected by the carousel selection system 120. The ranking may be performed by a software component of the user device 150. Alternatively, the ranking may be performed by a component of the carousel determination system 100, and ranking information associated with the set of display carousels selected by the carousel selection system 120 may be transmitted to the user device 150 with the set of display carousels selected.

The first carousel 515, a second carousel 525 and a third carousel 535, may contain media grouped together based on a common attribute of the media (e.g., a genre of the media, television media, film media, paid media, media associated with one or more subscription services, etc.). Alternatively, as in the first carousel 515, media of the carousel may be selected based on an attribute of the user of the user device 150, for example a genre of media the user is determined to have an interest in.

The titles of the carousel, here the first title 510, a second title 520, and a third title 530, may indicate the type of media selected for the carousel associated with the title. For example, the second title 520 is associated with the second carousel 525, and the second title 520 indicates to a user that the media contents of the second carousel 525 are television shows. In the present example, the third title 530 associated with the third carousel 535 indicates to a user that the media content displayed in the third carousel 535 for selection by the user are various live event viewing options.

While the present example user interface 500 comprises three carousels, it should be recognized that any number of carousels may be displayed by a user interface 500 associated with the carousel determination system 100. Additionally, a user may choose to scroll the user interface 500, which may result in the display of further media carousels not shown here. Additional aspects of the media delivery system may be available via the user interface 500, such as a user account information, which may be displayed in a portion of the user interface 500 or present a new user interface 500 to the user. Alternatively, additional aspects of the media delivery system available to the user may open a new window, application, or sub-window within the display of the user device 150.

While the carousels shown here in the example user interface 500 each display four media options, it should be recognized that any number of media options may be displayed in a carousel. For example, the first carousel 515 could comprise ten media items, and the number of media items displayed in a carousel may be based on the display size or display resolution of the user device 150. Additionally, the number of media items displayed in a carousel may be variable. For example, when a user selects a media item of the first carousel 515, the selected media item may expand on the display of the user device 150 to show relevant information (e.g., a synopsis, an actor list, an indication of the language of the media, etc.) or a trailer for the media. The first carousel 515 may then adjust the positioning and number of media items shown in the first carousel 515 to accommodate the larger display area used by the selected media item. Additionally, the user may scroll the first carousel 515 horizontally to access additional media items associated with the contents of the first carousel 515 as indicated by the first title 510. The number of media items displayed while scrolling the first carousel 515 may be fixed or variable. The first carousel 515 may be scrolled by the user indefinitely, until a number of media items related to the content of the first carousel 515 have been displayed (e.g., 100 media items may be shown and then scrolling for additional media items may no longer be allowed), or until a limit of the processing or memory of the user device 150 has been reached. The media presented when the first carousel 515 is scrolled by the user may continuously be selected from media which is not displayed previously in the first carousel 515. Alternatively, the first carousel 515 may repeat the display of media randomly or at a fixed point while the user scrolls the first carousel 515. Alternatively, the first carousel 515 may "loop" and display from the first media item once the user has scrolled the first carousel 515 to display a threshold number of media items. While the examples in here have been discussed in relation to the first carousel 515, any of the carousels of the user interface 500 may operate in any combination of the above examples or in an alternate way.

Execution Environment

Figure 6:
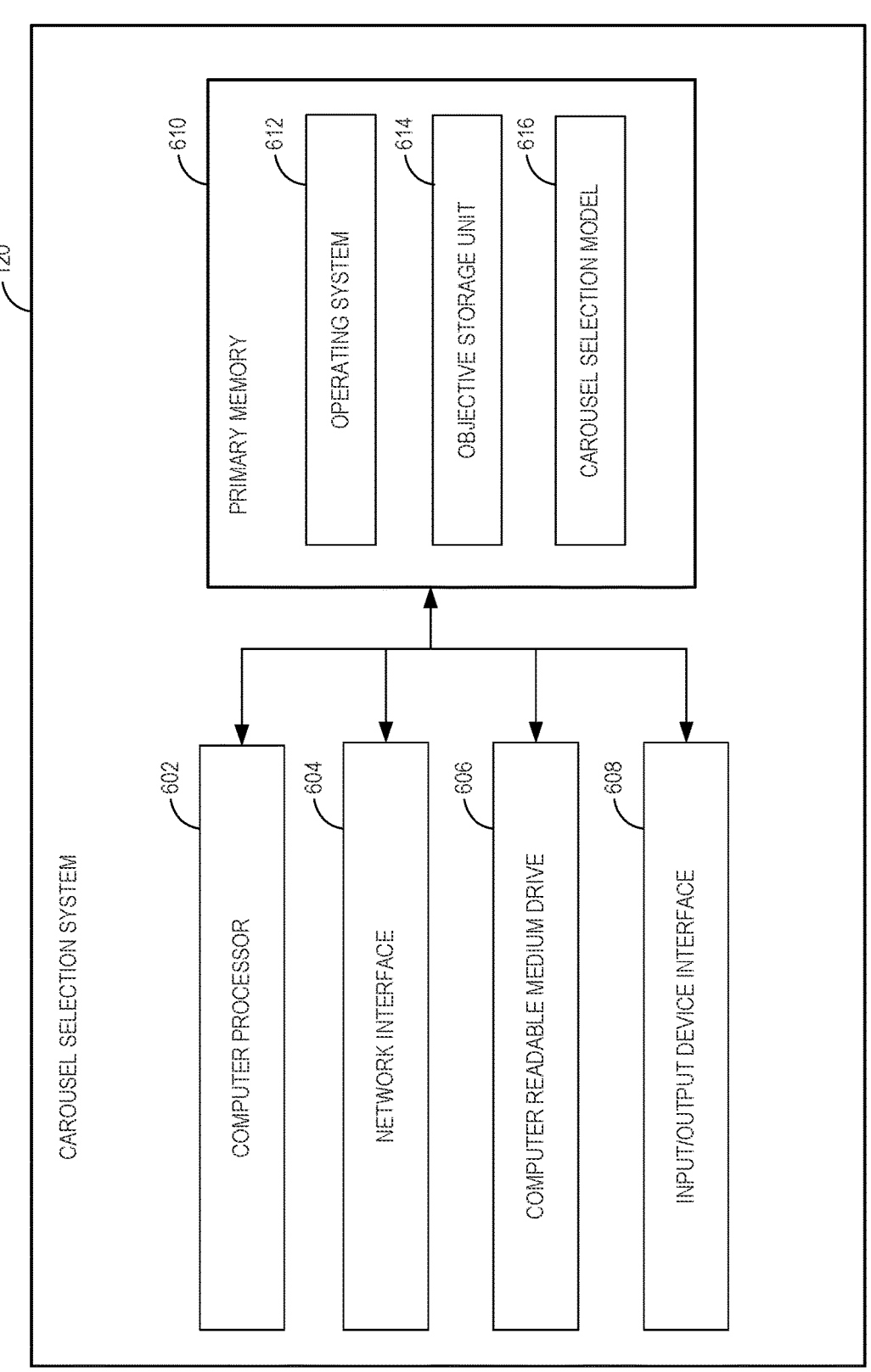
FIG. 6 is a block diagram of an illustrative computing system configured to select media carousels for display on a user device according to some embodiments.

FIG. 6 illustrates various components of an example carousel selection system 120 configured to implement the various functionality described herein.

In some embodiments, the carousel selection system 120 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the carousel selection system 120 may be implemented as web services consumable via one or more communication networks. In further embodiments, the carousel selection system 120 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, the carousel selection system 120 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SSDs"), flash drives, and/or other persistent non-transitory computer readable media; one or more input/output device interfaces 608, such as an ethernet communication interface, or a wireless communication interface; and one or more computer-readable memories 610, such as random access memory ("RAM") and/or other volatile non-transitory computer readable media.

The computer-readable memory 610 may include computer program instructions that one or more computer processors 602 execute and/or data that the one or more computer processors 602 use in order to implement one or more embodiments. For example, the computer-readable memory 610 can store an operating system 612 to provide general administration of the carousel selection system 120. As another example, the computer-readable memory 610 may store an objective storage unit 614 for storing various objectives of a media delivery system, as discussed above, for use by the carousel selection system 120 in selecting media carousels to display to a user. As another example, the computer-readable memory 610 may store a carousel selection model 616 implemented by a corresponding neural network or other machine learning structure. The 610 may alternately store a plurality of neural networks or other machine learning structures which may implement a carousel selection model 616, such that one or more neural networks or other machine learning structures may be selected for a given task as appropriate.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
receiving user information associated with a user;
receiving third-party information associated with at least one third party;
generating a relevance-ordered list of media carousels comprising a plurality of media carousels comprising a plurality of media types;
collecting historical log information comprising a plurality of displayed pages, wherein each of the displayed pages comprises a corresponding set of media carousels, and wherein each of the corresponding set of media carousels comprises at least one media object;
assigning a reward value to each of the plurality of displayed pages to generate a reward vector, the reward value based on a user interaction associated with each displayed page, wherein the reward vector comprises an indication of whether a user selected a media object from the corresponding set of media carousels of the plurality of displayed pages;
estimating a logging policy based in part on the historical log information, wherein the logging policy is estimated based in part on a loss function;
estimating a target policy based in part on the reward vector, wherein the target policy is determined based in part on a reward value;
training a carousel selection model based on the target policy and the logging policy;
applying the user information, the third-party information, and a page template to the carousel selection model to generate a result;
selecting, based in part on the result, a plurality of media carousels from the relevance-ordered list comprising a first media type and a second media type, wherein a number of media carousels selected is based on the page template; and
causing a user device to display the plurality of media carousels.

2. The computer-implemented method of claim 1, wherein the user information comprises at least one of a media type preference or user media subscription service information.

3. The computer-implemented method of claim 1, wherein the third-party information comprises a third-party ownership of a media item.

4. The computer-implemented method of claim 1, wherein the historical log information comprises user selection information.

5. The computer-implemented method of claim 1, further comprising:
receiving a set of test media carousels; and
testing the plurality of media carousels, wherein testing comprises comparing the plurality of media carousels to the plurality of test media carousels.

6. A non-transitory, computer-readable storage media comprising computer-executable instructions for selecting a plurality of media carousels, wherein the computer-executable instructions, when executed by a computing system, cause the computing system to:
generate a relevance-ordered list of media carousels comprising a plurality of media carousels comprising a plurality of media types;
collect historical log information comprising a plurality of displayed pages, wherein each of the displayed pages comprises a corresponding set of media carousels, and wherein each of the corresponding set of media carousels comprises at least one media object;
assign a reward value to each of the plurality of displayed pages to generate a reward vector, the reward value based on a user interaction associated with each displayed page, wherein the reward vector comprises an indication of whether a user selected a media object from the corresponding set of media carousels of the plurality of displayed pages;
estimate a logging policy based in part on the historical log information, wherein the logging policy is estimated based in part on a loss function;
estimate a target policy based in part on the reward vector, wherein the target policy is determined based in part on a reward value;
train a carousel selection model based on the target policy and the logging policy;
apply user information, third-party information, and a page template to the carousel selection model to generate a result;
select, based in part on the result, a plurality of media carousels from the relevance-ordered list comprising a first media type and a second media type, wherein a number of media carousels selected is based on the page template; and
cause a user device to display the plurality of media carousels.

7. The non-transitory, computer-readable storage media of claim 6, wherein the user information comprises a user device type.

8. The non-transitory, computer-readable storage media of claim 7, wherein the plurality of media carousels is further selected based in part on the user device type.

9. The non-transitory, computer-readable storage media of claim 6, wherein the first media type is a different media type from the second media type.

10. The non-transitory, computer-readable storage media of claim 6, wherein the historical log information is generated based in part on A/B testing, and wherein the user interaction associated with each page is collected during the A/B testing.

11. The non-transitory, computer-readable storage media of claim 6, wherein the computer-executable instructions, when executed by a computing system, further cause the computing system to:

estimate a shape parameter of a Dirichlet-multinomial based on the logging policy, wherein the logging policy is further based on a loss function calculated based in part on the historical log information.

12. The non-transitory, computer-readable storage media of claim 6, wherein the historical log information comprises user selection information.

13. The non-transitory, computer-readable storage media of claim 6, wherein the third-party information comprises a third-party ownership of a media item.

14. The non-transitory, computer-readable storage media of claim 6, wherein the computer-executable instructions, when executed by a computing system, further cause the computing system to:

populate a test page with a test set of carousels selected by a second computing system;

compare the display set of carousels to the test set of carousels to generate a second comparison result;

determine, based on the second comparison result, an accuracy score;

based on the accuracy score, update the logging policy; and train the carousel selection model based on the updated logging policy and the target policy.

15. A system comprising:

a memory storing computer-executable instructions;

a processor in communication with the memory, wherein the computer-executable instructions when executed by the processor cause the processor to:

generate a relevance-ordered list of media carousels comprising a plurality of media carousels comprising a plurality of media types;

collect historical log information comprising a plurality of displayed pages, wherein each of the displayed pages of the plurality of displayed pages comprises a corresponding set of media carousels, and wherein each of the corresponding set of media carousels comprises at least one media object;

assign a reward value to each of the plurality of displayed pages to generate a reward vector, the reward value based on a user interaction associated with each displayed page, wherein the reward vector comprises an indication of whether a user selected a media object from the corresponding set of media carousels of the plurality of displayed pages;

estimate a logging policy based in part on the historical log information, wherein the logging policy is estimated based in part on a loss function;

estimate a target policy based in part on the reward vector, wherein the target policy is determined based in part on a reward value;

train a carousel selection model based on the target policy and the logging policy;

apply a user information associated with a user, a third-party information item associated with a third party, and a page template to the carousel selection model to generate a result;

select, based in part on the result, a plurality of media carousels from the relevance-ordered list comprising a first media type and a second media type, wherein a number of media carousels selected is based on the page template; and cause a user device to display the plurality of media carousels.

16. The system of claim 15, wherein the user information comprises a user device type, and wherein the user device type is applied to the carousel selection model to generate the result.

17. The system of claim 15, wherein the logging policy is estimated based in part on defining the loss function, wherein the reward value is a total reward value, and wherein the target policy maximizes the total reward value.

18. The system of claim 15, wherein the historical log information is based on processed log data comprising log information associated with a plurality of interactions with displayed media carousels, and wherein the logging policy is defined by a log function calculated based in part on the processed log data.

19. The system of claim 15, wherein the reward vector is generated based in part on log data associated with the historical log information.

20. The system of claim 15, wherein the plurality of media carousels comprises a media offering associated with a first content provider and a media offering associated with a second content provider.

* * * * *